(12) United States Patent
Parkvall et al.

(10) Patent No.: US 10,390,342 B2
(45) Date of Patent: Aug. 20, 2019

(54) SIDELINK COMMUNICATION TECHNIQUES IN RADIOCOMMUNICATION SYSTEMS

(71) Applicant: TELEFONAKTIEBOLAGET LM ERICSSON (PUBL), Stockholm (SE)

(72) Inventors: Stefan Parkvall, Bromma (SE); Robert Baldemair, Solna (SE); Erik Dahlman, Stockholm (SE); Bengt Lindoff, Bjärred (SE); Karl Werner, Segeltorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 154 days.

(21) Appl. No.: 15/035,937

(22) PCT Filed: Apr. 1, 2016

(86) PCT No.: PCT/EP2016/057263
§ 371 (c)(1),
(2) Date: May 11, 2016

(87) PCT Pub. No.: WO2017/167401
PCT Pub. Date: Oct. 5, 2017

(65) Prior Publication Data
US 2017/0290000 A1    Oct. 5, 2017

(51) Int. Cl.
*H04W 72/04* (2009.01)
*H04W 76/14* (2018.01)
*H04W 76/23* (2018.01)

(52) U.S. Cl.
CPC ..... *H04W 72/0446* (2013.01); *H04W 72/042* (2013.01); *H04W 76/14* (2018.02); *H04W 76/23* (2018.02)

(58) Field of Classification Search
CPC ........... H04W 72/0446; H04W 72/042; H04W 76/023; H04W 76/14
See application file for complete search history.

(56) References Cited

U.S. PATENT DOCUMENTS

| | | | |
|---|---|---|---|
| 2014/0185529 A1* | 7/2014 | Lim | H04W 76/023 370/328 |
| 2016/0249198 A1* | 8/2016 | Kim | H04W 48/16 |
| 2017/0118743 A1* | 4/2017 | Kim | H04L 5/14 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)," 3GPP TS 36.211, V13.1.0, Mar. 2016.

(Continued)

*Primary Examiner* — Kwang B Yao
*Assistant Examiner* — Moo Jeong
(74) *Attorney, Agent, or Firm* — Patent Portfolio Builders PLLC (57) ABSTRACT

A method for sidelink communication between a first wireless node and a second wireless node is described, the sidelink communication using sub-frames of a first type and a second type. The first wireless node determines whether the first wireless node is an initiator or responder of the sidelink communication. If the first wireless node determines that the first wireless node is an initiator of the sidelink communication, then it transmits data directly toward the second wireless node using the first sub-frame type. Alternatively, if the first wireless node determines that the first wireless node is a responder of the sidelink communication, then it transmits data directly toward the second wireless node using the second sub-frame type, the first sub-frame type being different than the second sub-frame.

14 Claims, 10 Drawing Sheets

(56) References Cited

OTHER PUBLICATIONS

Ericsson, "Layer 2 procedures for D2D Communication," Tdoc R2-141256, 3GPP TSG-RAN WG2 #85bis, Mar. 31-Apr. 4, 2014, Valencia, ES.
Ericsson, "Resource allocation for D2D transmitters in coverage," Tdoc R2-140625, 3GPP TSG-RAN WG2 #85, Feb. 10-14, 2014, Prague, CZ.
International Search Report and Written Opinion dated Dec. 13, 2016 in related International Application No. PCT/EP2016/057263.
NEC, "Considerations of subframe design for D2D and cellular resource multiplexing," R1-140490, 3GPP TSG RAN WG1 Meeting #76, Feb. 10-14, 2014, Prague, CZ.
NEC, "Considerations of subframe design for D2D communication," R1-135270, 3GPP TSG RAN WG1 Meeting #75, Nov. 11-15, 2013, San Francisco, CA, US.

\* cited by examiner

SIDELINK COMMUNICATION TECHNIQUES IN RADIOCOMMUNICATION SYSTEMS

TECHNICAL FIELD

Embodiments of the subject matter disclosed herein generally relate to methods and systems for enabling sidelink communications (e.g., direct mobile-to-mobile communications) in radiocommunication systems and, more particularly, to frame structures which can be used in such sidelink communications.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. Now that LTE (also sometimes referred to as "4G") has been rolled out in implementations across the world, development attention has turned to the next generation of radiocommunication development, also referred to as the upcoming "5G" technologies.

After its initial rollout, the LTE specifications underwent further changes and improvements captured in various numbered releases. The most recent release for LTE was Release 14. In Release 12 of LTE, support for direct device-to-device (D2D) connectivity was first introduced. As the name suggests, direct D2D connectivity implies a direct radio link between devices, e.g., a direct radio link between two user equipments without a network node being involved in conveying payload data between the two user equipments. Given the relatively lower power of transmitters in mobile devices, D2D connectivity is typically only possible between devices in relatively close proximity to each other. Services based on D2D connectivity are therefore sometimes also referred to as proximity services or "ProSe". Some illustrative examples of D2D communications are provided in the Detailed Description below.

One reason for introducing support for D2D connectivity in the LTE specifications was an explicitly expressed interest to use the LTE radio-access technology for public-safety-related communication services. For the public-safety use case it is seen as important, and in some cases even a requirement, to support at least a limited degree of local connectivity between devices even when there is no radiocommunication infrastructure available. Thus, support for direct D2D connectivity was seen as an important component to ensure LTE's fulfillment of all the requirements of the public-safety use case. However, support for D2D connectivity may also enable new types of commercial services, thus expanding the usability of the LTE radio-access technology in general.

Those skilled in the art will be familiar with the conventional terms of "uplink" and "downlink", referring to radio resources which are assigned to enable communications from a user equipment to the network and from the network to a user equipment, respectively. However, for a direct device-to-device radio link, the notion of downlink and uplink transmission directions is not applicable. Instead, 3GPP has introduced the term "sidelink" to characterize the direct device-to-device link.

Since sidelink communications were not introduced into LTE from its inception, there have naturally been some design compromises which were required to enable sidelink communications to be added to an already mature radiocommunication design. For example, although LTE sidelink connectivity is technically possible in any portion of the normal cellular (LTE) spectrum, including both paired (FDD) and unpaired (TDD) spectrum, as well as both uplink and downlink spectrum, good co-existence between sidelink transmissions and normal cellular (downlink/uplink) transmissions in the same spectrum as well as existing regulatory requirements were key considerations in the design of LTE sidelink connectivity in Releases 12 and 13.

These considerations led to various design choices that characterize sidelink implementation in LTE. For example, sidelink communications were limited to uplink spectrum rather than also, or alternatively, using downlink spectrum. This choice was made based on, for example, both regulatory considerations (sidelink transmissions on the downlink spectrum would imply user equipment transmissions on spectrum allocated by regulatory bodies solely for transmissions by network devices), as well as ease of device implementation (from a device-implementation point-of-view, it is less complex to include additional receiver functionality (support for reception in an uplink band) compared to the additional transmitter functionality (needed in case sidelink connectivity would take place in downlink bands).

Another example involves the relatively simplistic nature of sidelink communications as implemented in LTE. In LTE Release 12 (and afterward), sidelink communications were understood to be fundamentally unidirectional in the sense that all sidelink transmissions are, essentially, broadcast transmissions with, for example, no associated control signaling in the opposite direction. There may of course be LTE sidelink transmissions from a device A received by a device B and, simultaneously, sidelink transmissions from device B received by device A. But these are then, radio-wise, completely independent transmissions.

Accordingly, with the advent of 5G radiocommunication systems, it would be desirable to develop sidelink communications that are designed to harmoniously co-exist with uplink and downlink communications from the inception of the new system, and which take advantage of being able to more freely balance complexity and performance of sidelink communications at the system's inception.

SUMMARY

According to an embodiment, a method for sidelink communication between a first wireless node and a second wireless node is described, the sidelink communication using sub-frames of a first type and a second type. The first wireless node determines whether the first wireless node is an initiator or responder of the sidelink communication. If the first wireless node determines that the first wireless node is an initiator of the sidelink communication, then it transmits data directly toward the second wireless node using the first sub-frame type. Alternatively, if the first wireless node determines that the first wireless node is a responder of the sidelink communication, then it transmits data directly toward the second wireless node using the second sub-frame type, the first sub-frame type being different than the second sub-frame type.

According to another embodiment, a wireless node includes a transceiver configured to transmit and receive wireless signals and a processor configured to control the transceiver to transmit and receive sidelink communications to and from a second wireless node. The processor is further configured to determine whether the wireless node is an initiator or responder of the sidelink communications. If the wireless node determines that the wireless node is an initiator of the sidelink communications, then the processor controls the transceiver to transmit data directly toward the second wireless node using a first sub-frame type. Alternatively, if the wireless node determines that the wireless node is a responder of the sidelink communications, then the processor controls the transceiver to transmit data directly toward the second wireless node using a second sub-frame type, the first sub-frame type being different than the second sub-frame type.

According to an embodiment, a communication system includes a first wireless communication device including a first processor and first radio circuitry configured to transmit and receive wireless communication signals, a second wireless communication device including a second processor and second radio circuitry configured to transmit and receive wireless communication signals; and a base station including a third processor and third radio circuitry configured to transmit and receive wireless communication signals. The base station is further configured to transmit downlink wireless communication signals toward said first and second wireless communication devices using downlink radio resources and to receive uplink wireless communication signals from said first and second wireless communication devices using uplink radio resources. The first and second wireless devices are configured to receive said downlink wireless communication signals from said base station on said downlink radio resources and to transmit said uplink wireless communication signals on said uplink radio resources. The first and second wireless devices are further configured to transmit sidelink wireless communication signals directly to one another using sidelink radio resources. When the first wireless device is an initiator of the sidelink communication signals, then the first wireless device transmits sidelink communication signals directly to the second wireless device using a first type of subframe. When the second wireless device is a responder of the sidelink communication signals, then the second wireless device transmits sidelink communication signals directly to the first wireless device using a second type of subframe, the first type of subframe being different than the second type of subframe.

In some embodiments, data transmitted on the uplink, downlink and sidelink radio resources can be transmitted using the same type of subframe formats, e.g., initiator transmissions and downlink transmissions can use a first type of subframe and respondent and uplink transmissions can use a second type of subframe format. Stated differently, downlink transmissions can use an initiator subframe format and uplink transmissions can use a respondent subframe format.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
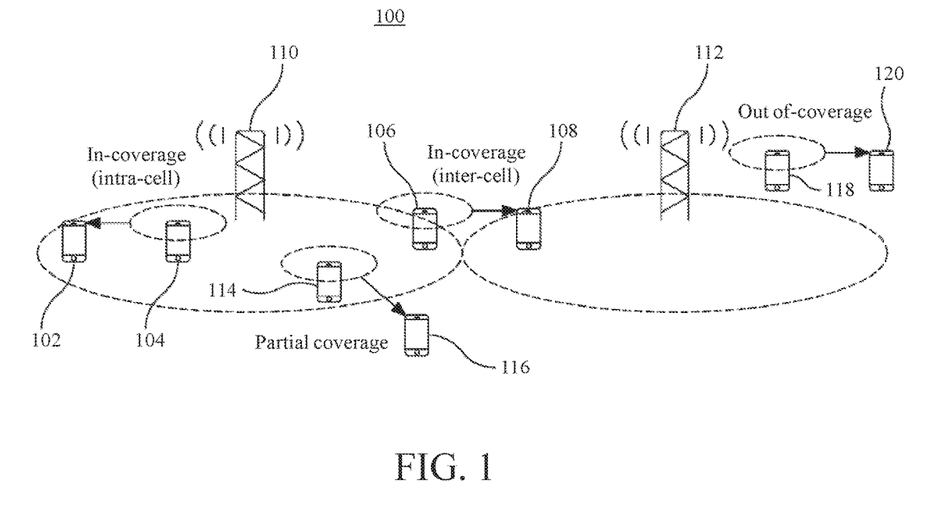
FIG. 1 depicts various network coverage situations associated with sidelink communications.

As mentioned above, when performing sidelink wireless communications two user equipments (UEs) can communicate with one another directly, i.e., without routing payload data through a network. The role of the network in such sidelink communications may, however, vary depending upon, for example, the location of the UEs relative to the network coverage. Various use/network coverage cases relative to sidelink communications are illustrated in the system 100 of FIG. 1. For example, two UEs 102 and 104 may both be covered by a network in the same cell (in-coverage, intra-cell case), whereas two other UEs 106, 108 may be covered by different eNodeBs 110, 112 (in-coverage, inter-cell case). In some situations, one of the UEs 114 may be within range of the network, whereas a second UE 116 is not (partial coverage case). Lastly both UEs may be operating out of range of the network coverage as exemplified by UEs 118 and 120 (out-of coverage case). When network coverage is available to one or both of the UEs involved in sidelink communications, the network may participate in various ways, e.g., by providing timing/synchronization information to help set up the sidelink communications or, according to an embodiment, to inform a UE of its role in the sidelink communication, i.e., initiator or responder.

Figure 2:
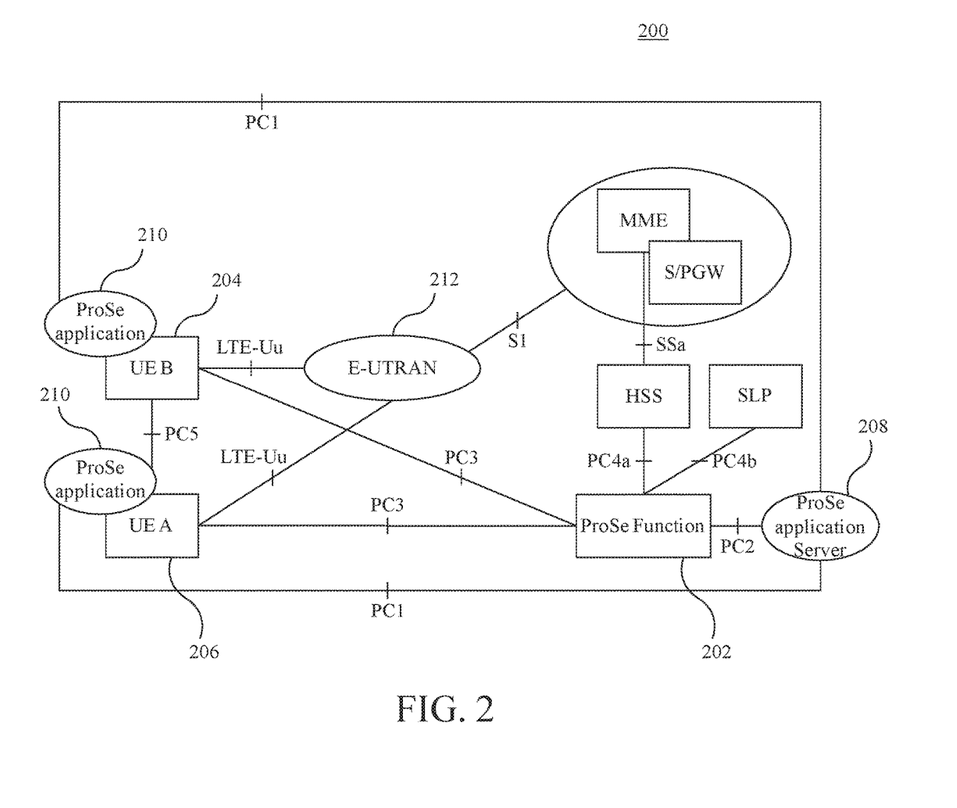
FIG. 2 shows an LTE sidelink network architecture.

An illustration of the network architecture 200 related to sidelink connectivity is provided in FIG. 2. To support sidelink connectivity a new ProSe Function 202 has been introduced in the core network together with a number of new network interfaces. Among these interfaces, PC5 corresponds to the direct sidelink between devices 204 and 206, while PC3 is the interface between sidelink-capable devices and the ProSe Function 202. The ProSe Function 202 is responsible for all sidelink functionality within the core network 200. The ProSe Function 202, for example, provides devices 204 and 206 with the parameters needed to establish sidelink connectivity (discovery or communication), when the devices are within range of the radio network coverage.

A ProSe application server 208 supports ProSe client applications 210 running on the wireless devices 204 and 206, via PC1 interfaces, and is connected to the ProSe Function via interface PC2. The remaining nodes illustrated in the core network architecture 200 of FIG. 2 (i.e., E-UTRAN, ME, S/PGW, HSS and SLP) will be familiar to those skilled in the art, are defined in the standardized 3GPP Technical Specifications (TS), and the interested reader is directed to those standards for more information regarding same. For example, the Evolved Universal Terrestrial Radio Access (E-UTRA) block 212 represents the network's portion of the radio access network, e.g., one or more eNodeBs/base stations, which provide network coverage as discussed above with respect to FIG. 1. While FIG. 2 depicts an LTE network architecture, those skilled in the art will appreciate that the embodiments described herein are not limited to application to LTE radiocommunication systems but can instead be applied to any such systems.

According to the embodiments described herein, and unlike sidelink implementations from Release 12/13 of LTE, the two wireless node participants in a sidelink communication are designated as having one of two roles: (1) an initiator role or (2) a responder role. Two subframe types are defined according to an embodiment and the subframe type to be used for a sidelink transmission is determined by the role of the transmitting node at a particular point in time. Thus a wireless node, e.g., either a one of a two UEs or one of two NW nodes, may be either an initiator or a responder and the sub frame type used for that wireless node's transmission is based on the role of the node. In an embodiment a determining step is introduced where the node determines whether it is an initiator or a responder and chooses the particular sub frame type to be used for transmission is based on the determination. In another embodiment, the node subsequently determines that it has a new role and it then uses the other sub frame type for subsequent transmissions.

Transmissions of data from one node to another node over a wireless channel are subject to errors (note that "wireless node" is used herein to refer to traditional NW nodes such as base stations and relays and also other nodes such as UEs, sensors, actuators). To handle such error events, a retransmission protocol is used. Upon reception of a data from a transmitting node, the receiving node can, at some point, transmit a feedback signal to acknowledge whether the data was successfully received or not. Feedback signals can be envisioned also for other purposes, e.g. channel-state feedback, sounding signals to support various antenna schemes, etc.

Figure 3A:
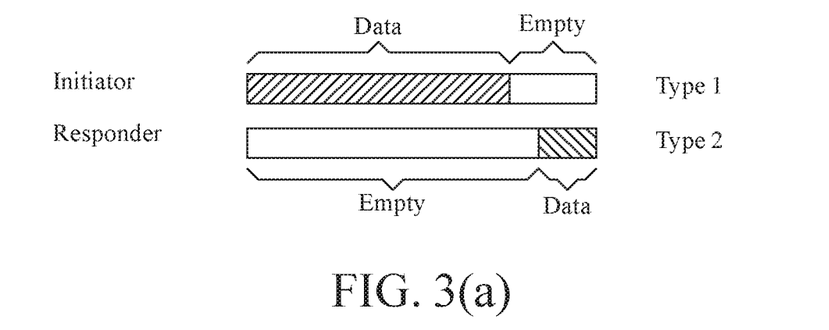
FIGS. 3(a) and 3(b) both illustrate a first type and a second type of sub-frame usable in sidelink communications, and their associated roles, according to an embodiment.

Sidelink transmissions, according to these embodiments, from one wireless node to another wireless node are organized in subframes of a certain duration. There are two subframe types defined in some embodiments, type 1 and type 2, as illustrated in FIG. 3(a). Subframe format type 1 can be used by a wireless node having the role of initiator for transmissions from the start of the subframe to a point occurring before or at the end of the subframe (as indicated by the shaded portion), followed in time by an empty portion. That is, subframe format type 1 can include a first data portion including a plurality of symbols followed by a second empty portion. Subframe format type 2 can be used by a wireless node having the role of responder for transmissions from some point in the subframe until the end of the subframe (as indicated by the shaded portion), and is preceded in time by an empty portion. That is, subframe format type 2 can include a first empty portion followed by a second data portion including a plurality of symbols. In the example of FIG. 3(a), the type 1 subframe can be used by the initiator to transmit payload data (in the shaded portion) and the type 2 subframe can be used by the responder to transmit, e.g., an acknowledgment message. When the wireless nodes involved in the sidelink communications are UEs, then neither the payload data nor the acknowledgement are transmitted through a base station or the core network, instead they are transmitted directly between the two UEs.

It can be seen that, in the example of FIG. 3(a), the portion (shaded) of the subframe during which the initiator is transmitting data is separated in time from when the responder is transmitting its data. This separation in time, e.g., including a guard period between the end of the initiator's data transmission and the beginning of the responder's data transmission, can be useful in certain embodiments, e.g., wherein the radiocommunication system allocates a single uplink frequency resource for sidelink communications operating using half duplex communications, e.g., time division duplex (TDD) communications.

Figure 4:
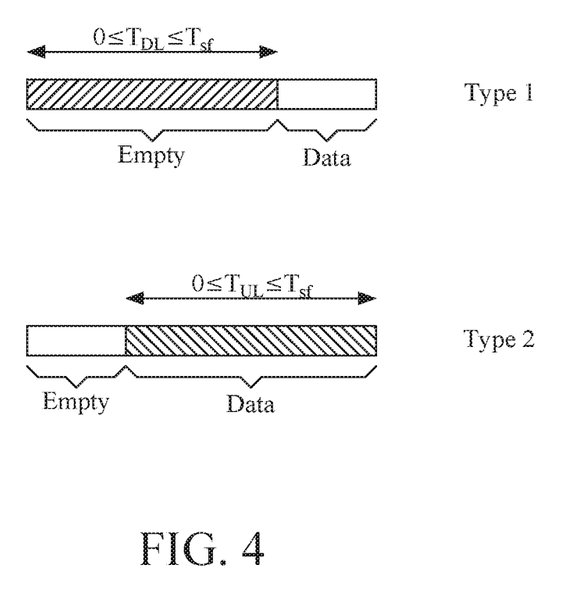
FIG. 4 illustrates a type 1 sub-frame and a type 2 sub-frame format according to an embodiment.

However this separation in time characteristic of the embodiment of FIG. 3(a) is not required. Instead, and more generally, as illustrated in FIG. 4, a type 1 subframe can be used to transmit data in a first (temporal) part of a subframe and a type 2 subframe can be used to transmit data in a second (temporal) part of a subframe, wherein the first and second parts can overlap in time. For example, these types of subframes could be used in sidelink communications operating using full duplex communications, e.g., frequency division duplex (FDD). The amount of data transmitted in a type 1 or type 2 subframe can vary. For example, as illustrated in the embodiment of FIG. 6, the initiator may choose to send a scheduling request for data to be transmitted by the responder, whereby the initiator's type 1 subframe contains less data than the responder's type 2 subframe.

Although not shown in the Figures, a timing advance may be applied to either the transmission of a type 1 or type 2 subframe, such that the beginnings of the subframes are offset in time.

Figure 3B:
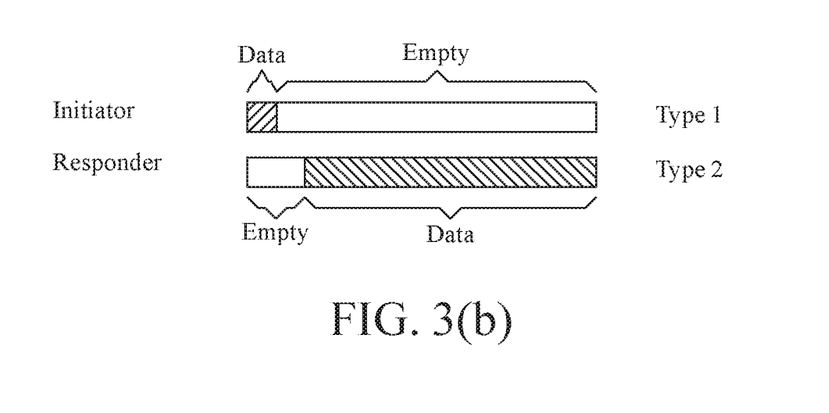
Figure 5:
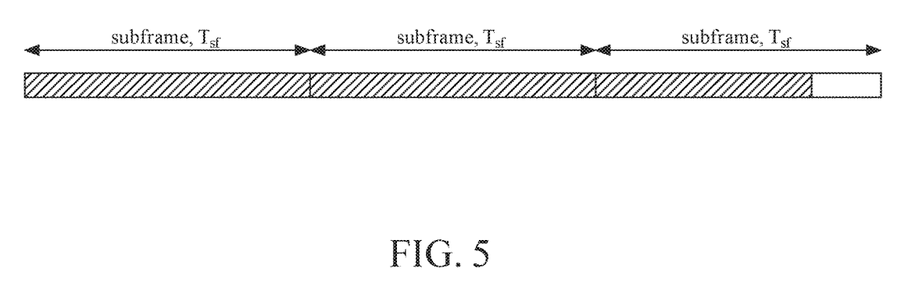
FIG. 5 shows a sidelink transmission involving three subframes according to an embodiment.

FIG. 3(b) illustrates another embodiment wherein the initiator wireless node schedules a data transmission from the responder wireless node (e.g. a base station scheduling uplink transmission from a UE). In this embodiment, the smaller transmission from the initiator is the scheduling command, while the larger transmission from the responder is the data sent in response to the scheduling command. With any of these sets of initiator and responder subframe building blocks, from FIGS. 3(a), 3(b), and 4, transmissions spanning multiple subframes can be constructed as illustrated, for example, in FIG. 5.

Figure 6:
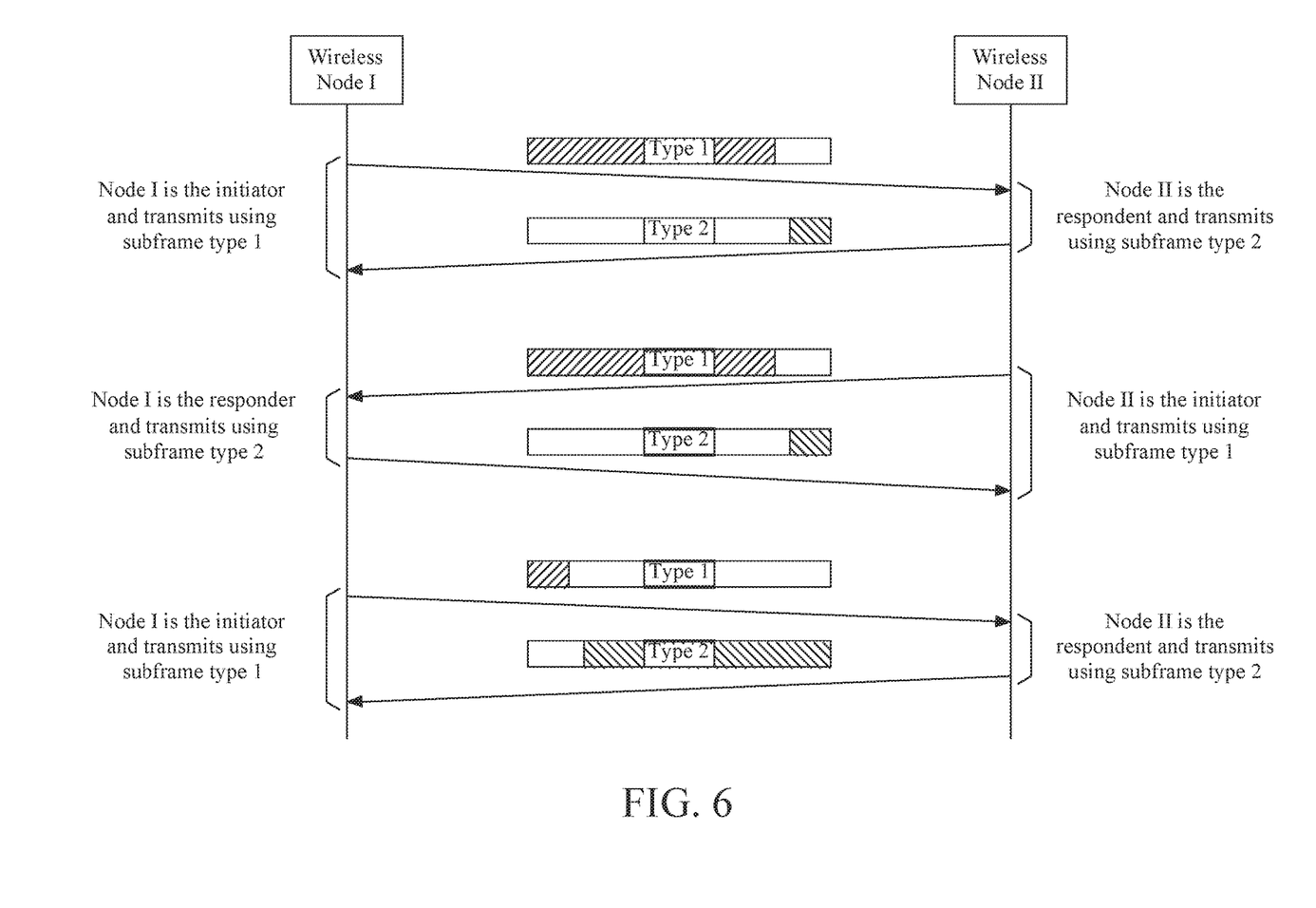
FIG. 6 illustrates a sequence of transmissions between wireless nodes according to an embodiment.

FIG. 6 shows other examples of transmissions between wireless nodes using either type 1 or type 2 subframes. In the uppermost example, Node I is the initiator and transmits using a type 1 subframe and Node II is the respondent and transmits using subframe type 2. In the middle sequence, conversely, Node II is the initiator and transmits using subframe type 1, whereas Node I is the respondent and transmits using subframe type 2. This latter example shows how the roles of wireless nodes may change over time with respect to one another. The lowermost transmission sequence shows the aforementioned initiator sending a scheduling request for data to be transmitted by the responder, whereby the initiator's type 1 subframe contains less data than the responder's type 2 subframe.

Figure 7:
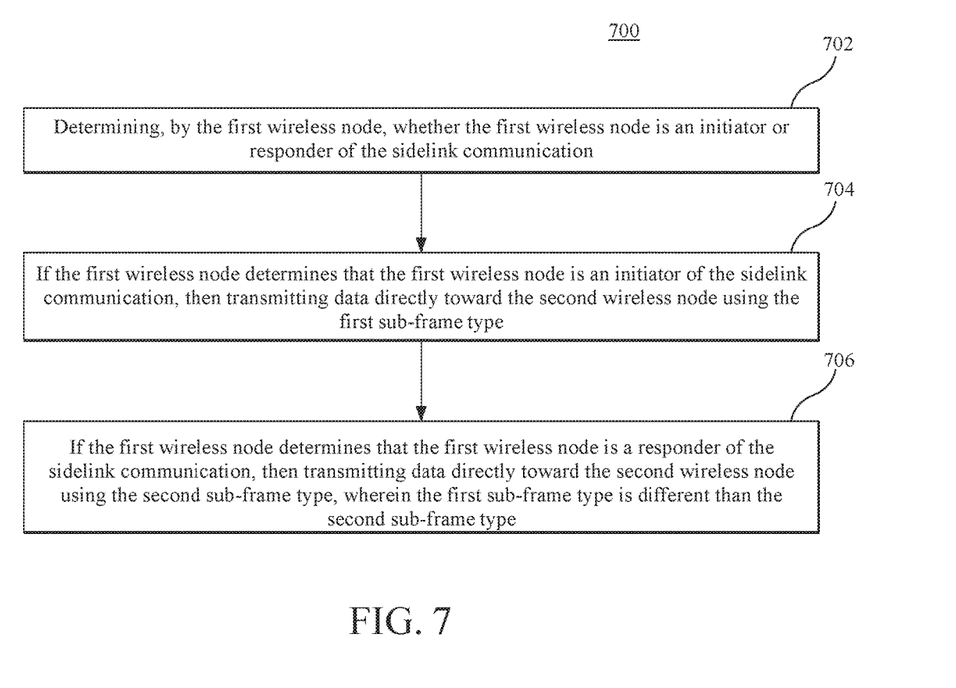
FIG. 7 is a flowchart illustrating a method according to an embodiment.

A method for sidelink communication between a first wireless node and a second wireless node, wherein the sidelink communication uses sub-frames of a first type and a second type is illustrated in the flow diagram of FIG. 7. This method is described from the point of view of a single (first) wireless node, e.g., either a UE or a NW node. Therein, at step 702, the first wireless node determines whether the first wireless node is an initiator or responder of the sidelink communication. If, at step 704, the first wireless node determines that the first wireless node is an initiator of the sidelink communication, then it transmits data directly toward the second wireless node using the first sub-frame type. If, on the other hand, the first wireless node determines that the first wireless node is a responder of the sidelink communication, then it transmits data directly toward the second wireless node using the second sub-frame type, the first sub-frame type is different than the second sub-frame. This method is applicable to any of the first and second sub-frame types described above, as well as other such sub-frame types.

From the foregoing it will be appreciated that the determination by a wireless node of whether it is an initiator or a respondent with regard to a specific communication is significant so that it chooses the right subframe type for its next transmission on a particular sidelink communication resource. This determination can, for example, be made in a variety of ways. If, for example, the wireless node is a UE that currently has radio network coverage, or is a base station, then the wireless node can be informed by the network as to its role.

Alternatively, if the wireless node is a UE that currently has no network coverage, or if it autonomously decides to initiate a sidelink communication with another nearby UE, then it may determine itself that it should operate in the role of initiator. Still further the role could be determined based on the identity or type of the node for which the transmission is intended. For example if the node that transmits is a terminal and it is transmitting to a base station, then the subframe type should be that of the uplink.

Figure 8:
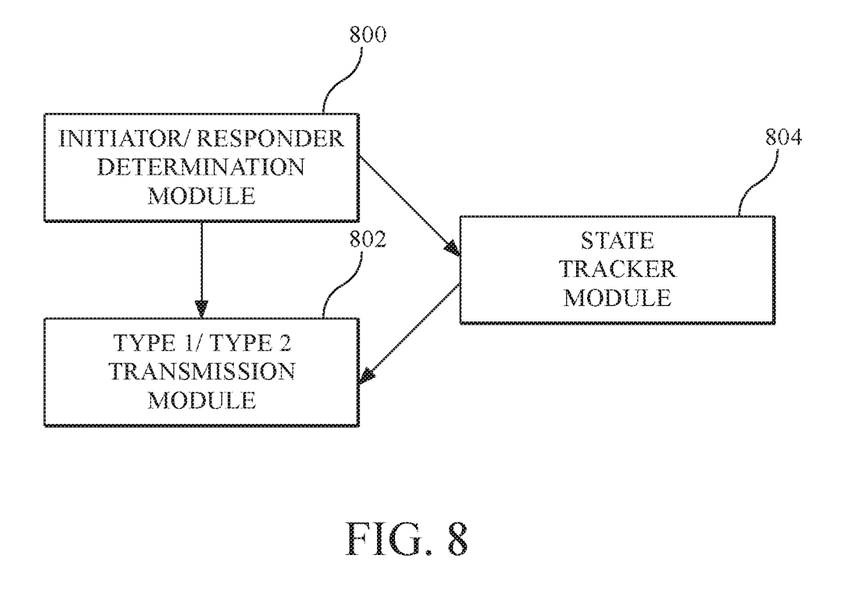
FIG. 8 depicts various modules according to an embodiment.

Regardless of which criteria or mechanism are used for role determination, this function could be performed by an initiator/responder determination module or block 800 within the wireless node itself, as indicated in FIG. 8. The determination made by module 800 can be forwarded to a type 1/type 2 transmission module 802 which, in turn, operates to transmit data using either a type 1 sub-frame or a type 2 sub-frame based on whether the determination module 800 has determined that the wireless node is an initiator or a respondent as described previously. Optionally, the determination made by the determination module 800 can also be sent to a state tracker module 804 which can store an identification of the determined role along with an identification of the sidelink communication associated with that determination for future use in determining the role of that particular wireless node with respect to a particular other wireless node.

As mentioned previously, the term "wireless node" as used herein is intended to be generic to user equipments, network nodes, and other devices such as sensors, actuators, smart meters, cars, and other devices, e.g., Internet of Things devices. Any pairs of such devices can be involved in sidelink communications according to some embodiments, although according to other embodiments only non-network nodes are involved in sidelink communications. To further illustrate examples of such devices, a user equipment and a network node will now be described in more detail with respect to FIGS. 9 and 10, respectively.

Figure 9:
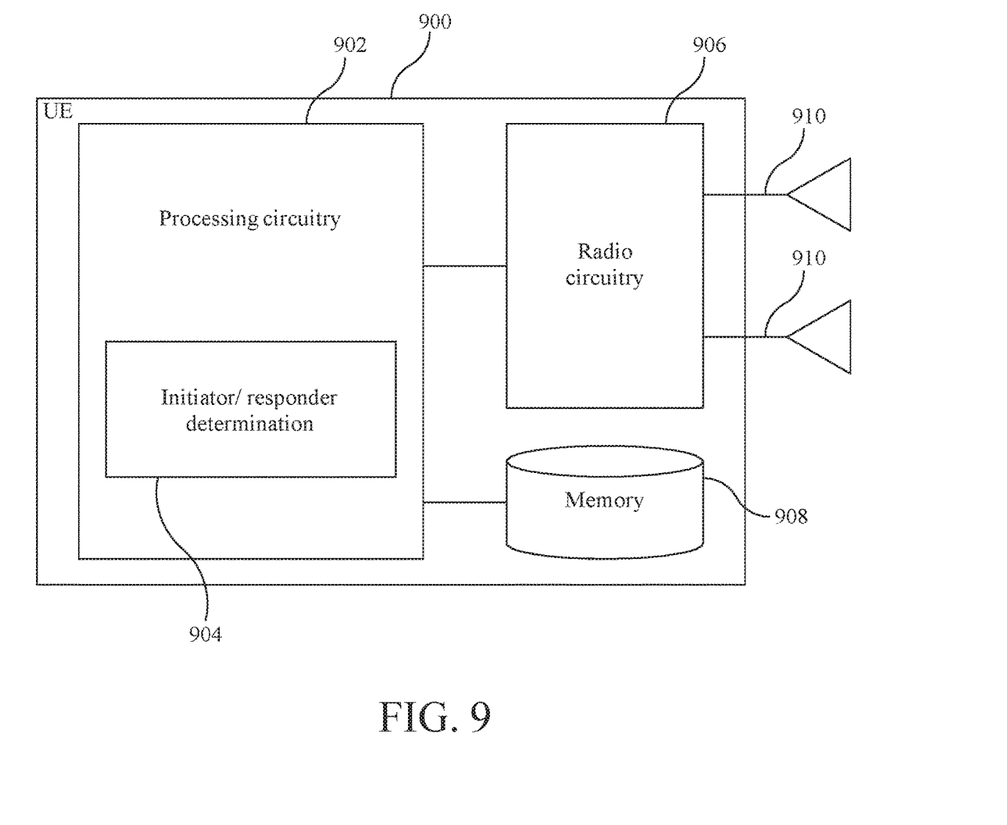
FIG. 9 is a user equipment.

FIG. 9 shows a user equipment 900 which can be one of the participants in a sidelink wireless communication and which can determine its role as either an initiator or a respondent as, for example described above with respect to FIG. 7. The wireless device comprises radio circuitry 906, e.g., a transceiver, and processing circuitry 902. The processing circuitry 902 is configured to, among other things, determine its role in sidelink communications by using an initiator/responder determination unit 904. The processing circuitry 902 is further configured to control the radio circuitry 906 to use the appropriate subframe type based on an output of the determination unit 904, as described previously, to transmit data on sidelink channels. The UE 900 also includes a memory device 908 for storing data and programs, as well as one or more antenna(s) 910 to receive/transmit radio signals.

Figure 10:
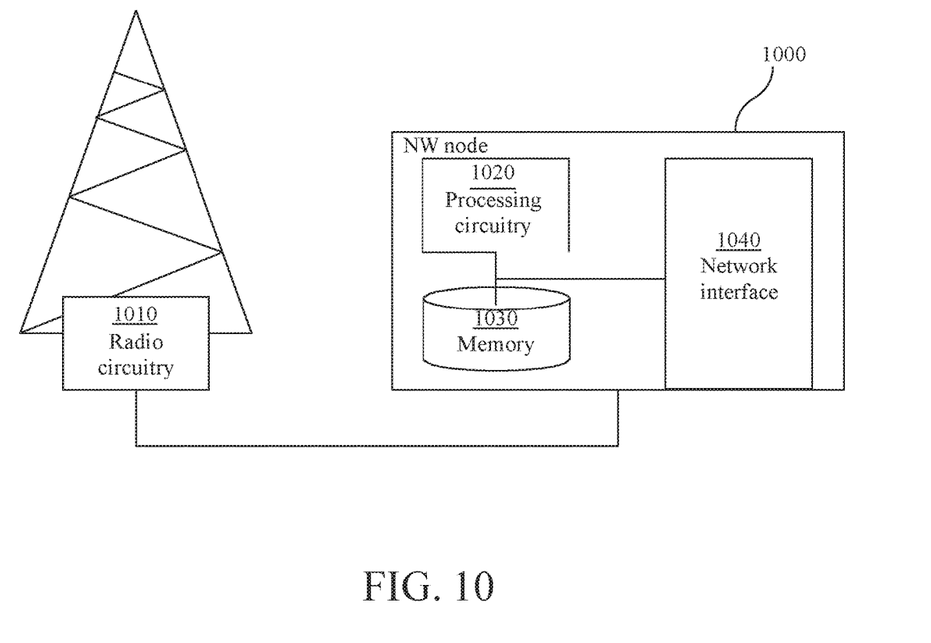
FIG. 10 is a network node.

FIG. 10 illustrates a network node 1000, e.g., an eNodeB, for transmitting and receiving data to and from user equipments on downlink and uplink channels, respectively. Although such NW nodes can communicate between themselves using sidelink communication channels, their description here is primarily provided to contrast such nodes (and their communication links with UEs) from those other wireless nodes which more typically might be expected to engage in sidelink communications. The network node 1000 comprises processing circuitry 1020, and is connectable to radio circuitry 1010, e.g., a transceiver. In some variants, the radio circuitry 1010 is comprised in the network node 1000, whereas in other variants, the radio circuitry 1010 is external. The processing circuitry 1020 is configured to transmit, via the radio circuitry 1010, downlink data to the user equipments 900, and to receive, via the radio circuitry 1010, uplink data from the user equipments 900.

The processing circuitry 902, 1020 may comprise one or several microprocessors, digital signal processors, and the like, as well as other digital hardware. The memories 908, 1030 which may comprise one or several types of memory such as read-only memory (ROM), random-access memory, cache memory, flash memory devices, optical storage devices, etc., stores program code for executing one or more telecommunications and/or data communications protocols and for carrying out one or more of the techniques described herein. The NW node 1000 also includes a memory 1030 and a network interface 1040 for interfacing with the core network.

However it should also be noted that, in some embodiments, data transmitted on the uplink, downlink and sidelink radio resources can be transmitted using the same type of subframe formats, e.g., initiator transmissions and downlink transmissions can use a first type of subframe and respondent and uplink transmissions can use a second type of subframe format.

Not all of the steps of the techniques described herein are necessarily performed in a single microprocessor or even in a single module.

Additionally, in some embodiments the non-limiting term user equipment (UE) is used and it refers to any type of wireless device communicating with a network node in a cellular or mobile communication system over radio interface, or with another UE or wireless device using a sidelink communication resource. Examples of UEs are target devices, device to device (D2D) UEs, proximity-based service (ProSe) UEs, machine type UEs or UEs capable of machine to machine communication (aka category 0 UEs, low cost and/or low complexity UEs), PDAs, iPADs, tablets, mobile terminals, smart phones, laptop embedded equipment (LEE), laptop mounted equipment (LME), USB dongles, wireless devices etc.

Various embodiments described herein refer to network nodes. In some embodiments the non-limiting term network node refers to any type of network node which directly or indirectly communicates with the UE. It can be radio network node or a node in a core network or fixed part of the network. For example it can be a network node serving the UE, a network node neighboring to the serving network node of the UE, any network node in the radio network or in the core network in wireless communication system in which UE operates. Examples of network nodes are base stations (BS), multi-standard radio (MSR) radio nodes such as MSR BS, eNode B (eNB), network controllers, radio network controllers, base station controllers, relay, donor node controlling relays, base transceiver stations (BTS), access points (AP), core network nodes (e.g. MSC, MME etc), O&M, OSS, SON, location server (e.g. E-SMLC), MDT etc.

The embodiments are described for LTE and/or the next generation evolution of LTE, i.e., "5G". However the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000 etc.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for sidelink communication between a first wireless node and a second wireless node, the sidelink communication using sub-frames of a first type and a second type, the method comprising:
    determining, by the first wireless node, that the first wireless node is an initiator of the sidelink communication;
    transmitting data directly toward the second wireless node using the first sub-frame type;
    subsequent to the transmission of the data directly toward the second wireless node using the first sub-frame type, determining that the first wireless node is a responder and transmitting data, by the first wireless node, directly toward the second wireless node using the second sub-frame type,
    wherein the first sub-frame type is different than the second sub-frame,
    wherein the first sub-frame type and the second sub-frame type are used for different transmissions,
    wherein the first sub-frame type includes a first data portion including a plurality of symbols followed by a second empty portion, and
    wherein the second sub-frame type includes a first empty portion followed by a second data portion including a plurality of symbols.

2. The method of claim 1, wherein the first and second wireless nodes are both user equipments and wherein the different transmissions are transmitted directly between the user equipments via sidelink radio resources without passing through a base station.

3. The method of claim 1, further comprising:
    determining, by the first wireless node, that the first wireless node is the initiator of the sidelink communication based on a received command or a received transmission.

4. The method of claim 1, further comprising:
    subsequent to the transmission of the data directly toward the second wireless node using the first sub-frame type and prior to the determining that the first wireless node is the responder, receiving the second data portion of the second sub-frame type from the second wireless node, wherein a time associated with the second empty portion of the first sub-frame type transmitted by the first wireless node is used by the first wireless node for reception of the second data portion of the second sub-frame type from the second wireless node.

5. The method of claim 1, further comprising:
    prior to determining that the first wireless node is the responder and prior to transmitting data, by the first wireless node, directly toward the second wireless node using the second-subframe type, receiving the first data portion of the first sub-frame type from the second wireless node, wherein a time associated with the first empty portion of the second sub-frame type transmitted by the first wireless node is used by the first wireless node for reception of the first data portion of the first sub-frame type from the second wireless node.

6. The method of claim 1, further comprising:
    transmitting, by the first wireless node, data toward a network using uplink radio resources; and
    receiving, by the first wireless node, data from the network using downlink radio resources.

7. The method of claim 6, wherein the data transmitted toward the network on the uplink is transmitted using the second sub-frame type and the data received from the network is received on the downlink in the first sub-frame type.

8. A first wireless node comprising:
    a transceiver configured to transmit and receive wireless signals; and
    a processor configured to control the transceiver to transmit and receive sidelink communications to and from a second wireless node,
    wherein the processor is further configured to determine that the first wireless node is an initiator of the sidelink communications;
    wherein the processor controls the transceiver to transmit data directly toward the second wireless node using a first sub-frame type;
    wherein subsequent to the transmission of the data directly toward the second wireless node using the first sub-frame type, the processor determines that the first wireless node is a responder and the processor controls the transceiver to transmit data, by the first wireless node, directly toward the second wireless node using a second sub-frame type, wherein the first sub-frame type is different than the second sub-frame, wherein the first sub-frame type and the second sub-frame type are used for different transmissions, wherein the first sub-frame type includes a first data portion including a plurality of symbols followed by a second empty portion, wherein the second sub-frame type includes a first empty portion followed by a second data portion including a plurality of symbols.

9. The wireless node of claim 8, wherein the first and second wireless nodes are both user equipments and wherein the different transmissions are transmitted between the user equipments via sidelink radio resources without passing through a base station.

10. The wireless node of claim 8, wherein the processor is further configured to determine that the first wireless node is an initiator of the sidelink communication based on a received command or a received transmission.

11. The wireless node of claim 8, wherein subsequent to the transmission of the data directly toward the second wireless node using the first sub-frame type and prior to the determining that the first wireless node is the responder, the processor is further receives the second data portion of the second sub-frame type from the second wireless node, wherein a time associated with the second empty portion of the first sub-frame type transmitted by the first wireless node is used by the first wireless node for reception of the second data portion of the second sub-frame type from the second wireless node.

12. The wireless node of claim 8, wherein prior to determining that the first wireless node is the responder and prior to transmitting data, by the first wireless node, directly toward the second wireless node using the second-subframe type, receiving the first data portion of the first sub-frame type from the second wireless node, wherein a time associated with the first empty portion of the second sub-frame type transmitted by the first wireless node is used by the first wireless node for reception of the first data portion of the first sub-frame type from the second wireless node.

13. The wireless node of claim 8, wherein the processor is further configured to control the transceiver to transmit data toward a network using uplink radio resources and to receive data from the network using downlink radio resources.

14. The wireless node of claim 13, wherein the data transmitted toward the network on the uplink is transmitted using the second sub-frame type and the data received from the network is received on the downlink in the first sub-frame type.

* * * * *